United States Patent [19]
Hayakawa

[11] Patent Number: 5,557,080
[45] Date of Patent: Sep. 17, 1996

[54] SWITCHING DEVICE

[75] Inventor: Hiroshi Hayakawa, Furukawa, Japan

[73] Assignee: Alps Electric Co., Ltd., Tokyo, Japan

[21] Appl. No.: 398,705

[22] Filed: Mar. 6, 1995

[30] Foreign Application Priority Data

Mar. 8, 1994 [JP] Japan .................................. 6-065539

[51] Int. Cl.$^6$ ...................................................... H01H 9/00
[52] U.S. Cl. ........................................ 200/5 R; 200/52 R
[58] Field of Search ................................... 200/5 A, 5 R, 200/52 R, 61.85, 302.1–302.3, 61.58 R

[56] References Cited

U.S. PATENT DOCUMENTS

| | | | |
|---|---|---|---|
| 4,180,713 | 12/1979 | Gonzales | 200/52 R |
| 4,713,509 | 12/1987 | Chebowski | 200/333 X |
| 4,718,862 | 1/1988 | Beeman | 439/482 |
| 5,245,142 | 9/1993 | Sacco et al. | 200/5 R |
| 5,286,078 | 2/1994 | Mottino et al. | 200/52 R X |
| 5,294,758 | 3/1994 | Frankhouse et al. | 200/5 R |
| 5,331,260 | 7/1994 | Ahmed | 200/5 R X |

FOREIGN PATENT DOCUMENTS 3-125614  12/1991  Japan .

Primary Examiner—J. R. Scott
Attorney, Agent, or Firm—Guy W. Shoup; Patrick T. Bever

[57] ABSTRACT

A switching device for selectively actuating front and rear windows of a vehicle. The device includes: a case, a first switch assembly mounted on a front end of the case for raising and lowering the selected windows, and a second switch assembly for selecting between the front and rear windows controlled by the first switch assembly. The second switch assembly includes a switch which is biased into a first state in which the first switch assembly controls the front windows. The first switch assembly only controls the rear windows when an operator depresses an operation member of the second switch assembly while manipulating the operation members of the first switch assembly. In one embodiment, the second switch assembly is positioned such that the operation member is manipulated by a palm of the operator's hand. In another embodiment, the second switch assembly is positioned such that the operation member is manipulated by a thumb of the operator's hand. In both embodiments, the first switch assembly is manipulated by the operator's fingers.

9 Claims, 2 Drawing Sheets

SWITCHING DEVICE

BACKGROUND OF THE INVENTION

1. Field of the Invention

The present invention relates to a switching device for actuating a plurality of actuation mechanisms. In particular, the invention relates to a switching device for performing remote control operation of a vehicle window.

2. Description of the Related Art

Conventionally, a switching device for manipulating a plurality of actuation mechanisms typically requires switching operation members according to the number of actuation mechanisms and is constructed such that one of the members is operated to actuate a specific mechanism. For example, a switching device for remotely controlling vehicle windows is generally provided for a driver's seat and other seats, The device provided for the driver's seat remotely controls all the windows (four in total disposed on the right and left sides adjacent to the front and rear seats) including the window adjacent to the driver's seat. Such a device has four switching operation members, formed in a narrow shape, corresponding to the respective windows. The four members are generally placed such that one at the front right corresponds to the front right window, one at the front left to the front left window, one at the rear right to the rear right window, and one at the rear left to the rear left window. The operation members are adapted to drive the corresponding respective switches. They are formed either of a seesaw type or a pull-push type in which they are operated in opposite directions with respect to the neutral position so as to open and close the windows, respectively. The operation for closing the windows can be performed in two stages. Namely, the operation in a first stage is performed to allow the switches to be manually actuated, while the operation in a second stage is performed to allow the switches to be automatically actuated. More specifically, in the first stage, the windows are closed only when the operation members continue to be engaged by the operator, while in the second stage, the windows close completely even if the operator ceases to engage the operation member half way through the closing operation.

However, the conventional switching device of this type presents the following problems. When it is desired that the driver attempt to open and close the windows while driving, it is difficult to first identify the position of the wanted switching operation member and then to operate it. It is thus necessary to grope for the wanted switching operation member to identify its position, in which case, it takes time to select the wanted switching operation member from among a number of switches.

As one of the measures for solving the above problems, the following method may be employed by way of example. The number of switch operation members is decreased with the application of a technique used in a conventional mirror control switching device. That is, a changeover switch for changing control between the front and rear windows. However, this method still encounters the following problems. The windows located adjacent to the front seats are more frequently opened and closed than those adjacent to the rear seats. The driver is thus inclined to assume that the switching operation is performed only to actuate the windows located to the front seats. However, according to the conventional device constructed as described above, once the windows to be actuated are switched, such a mode is maintained until another switching operation is performed. This may often involve the following complicated operation. The driver is unaware that the changeover switch has been changed until the switching operation is actually performed to erroneously actuate the window adjacent to the rear seat instead of that to the front seat. The driver thus returns the window located to the rear seat to its position before the erroneous operation was performed, and operates the changeover switch again for changing the windows to be actuated. Subsequently, the switching operation member is once again operated to actuate the window adjacent to the front seat.

SUMMARY OF THE INVENTION

Accordingly, in view of this background of the known art, an object of the present invention is to provide a switching device which can be reliably operated even when groped for without being observed.

In order to achieve the above object, the present invention provides a switching device for allowing actuation mechanisms, for example, mechanisms for opening and closing vehicle windows, to be actuated. The switching device comprises: one of a first switching operation member and a first switching operation member group for allowing the actuation mechanisms to be actuated; and a second switching operation member for changing the mechanisms to be actuated. The second member is adapted to drive an automatic reset switch. The mechanisms to be actuated are changed only when the second switching operation member is operated. One of the first switching operation member and the first switching operation member group is placed in the forward portion of a case for the switching device, while the second switching operation member is placed in the rearward portion or on the lateral surface of the case.

With this arrangement of the device, there can be a decrease in the number of switching operation members, which can thus be easily operated even groped for without being observed. Also, since the operation members are placed as described above, the first switching operation members or the first switching operation member group and the second switching operation member can be simultaneously operated. Further, a switch driven by the second switching operation member is adapted to be automatically reset so that actuation mechanisms, for example, window opening and closing mechanisms, can be switched only when the second member is operated. Hence, it is possible to operate an actuation mechanism which is normally actuated at comparatively high frequencies without paying attention to whether such a mechanism is ready to be actuated, which otherwise would involve another switching operation.

DESCRIPTION OF THE PREFERRED EMBODIMENTS

Embodiments of a switching device of the present invention will now be described with reference to the drawings.

Figure 1:
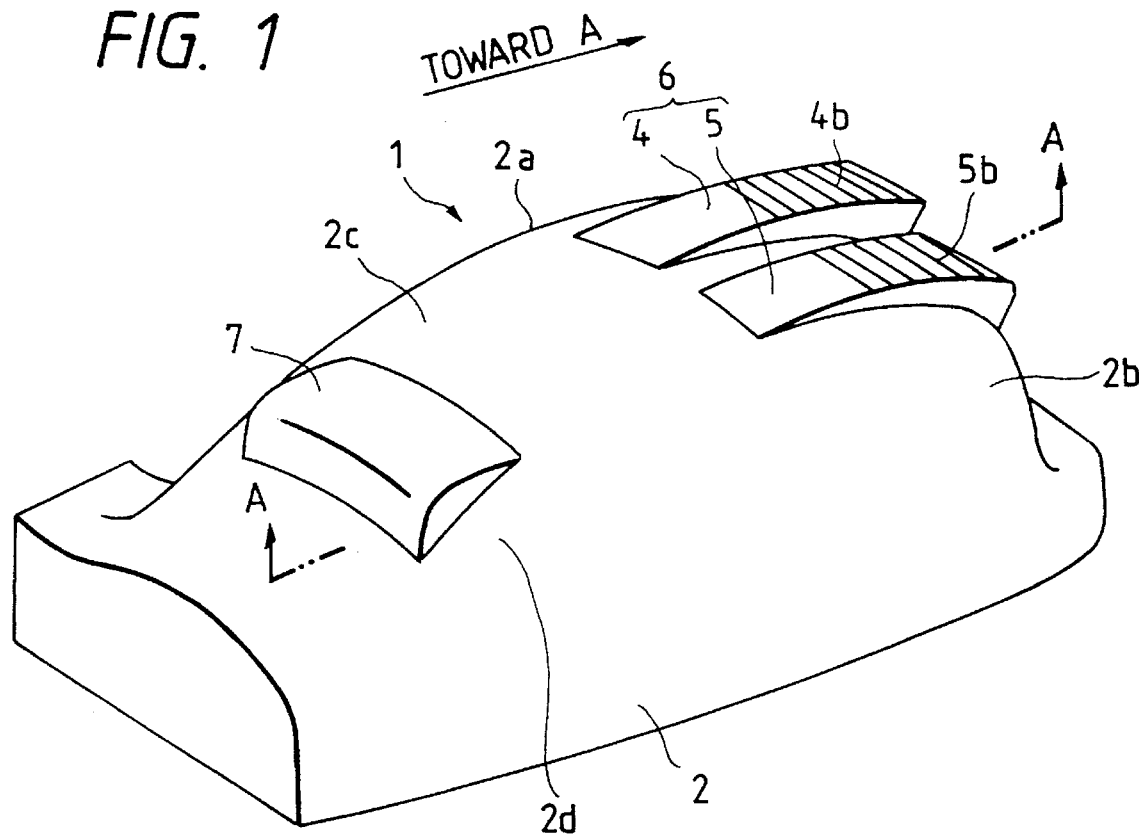
FIG. 1 is a perspective view of a switching device for opening and closing windows according to one embodiment of the present invention.
Figure 2:
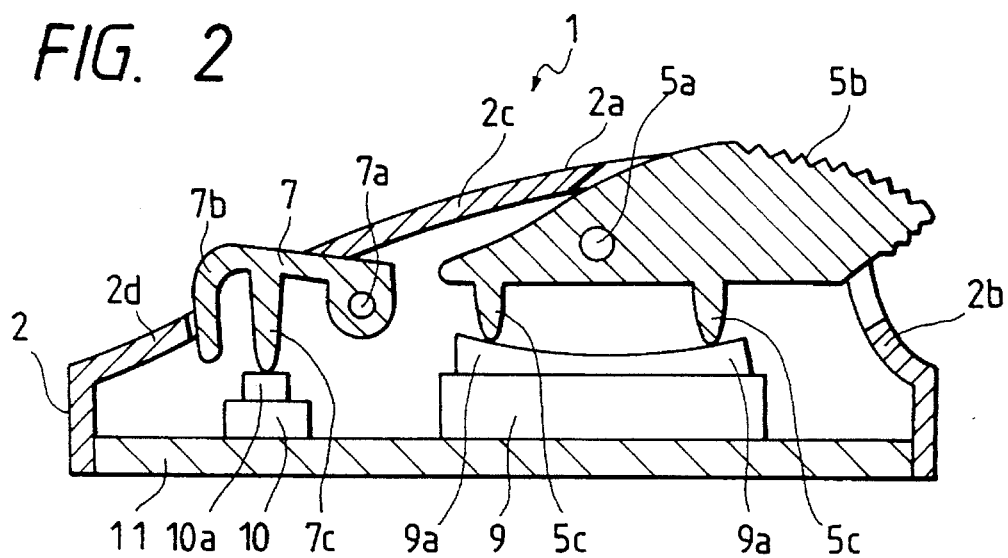
FIG. 2 is a sectional view along A—A line of FIG. 1.
Figure 3:
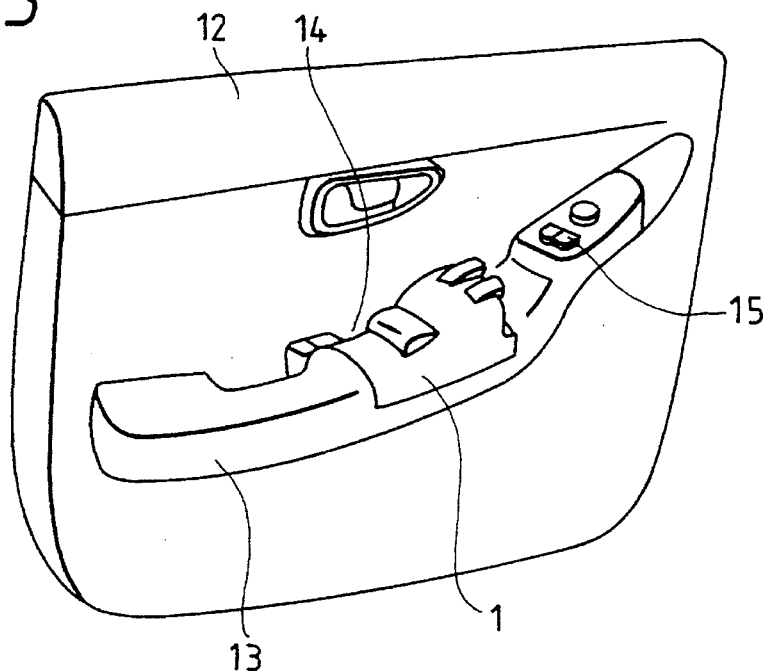
FIG. 3 is a perspective view of the switching device shown in FIG. 1 built into a vehicle door panel.
Figure 4:
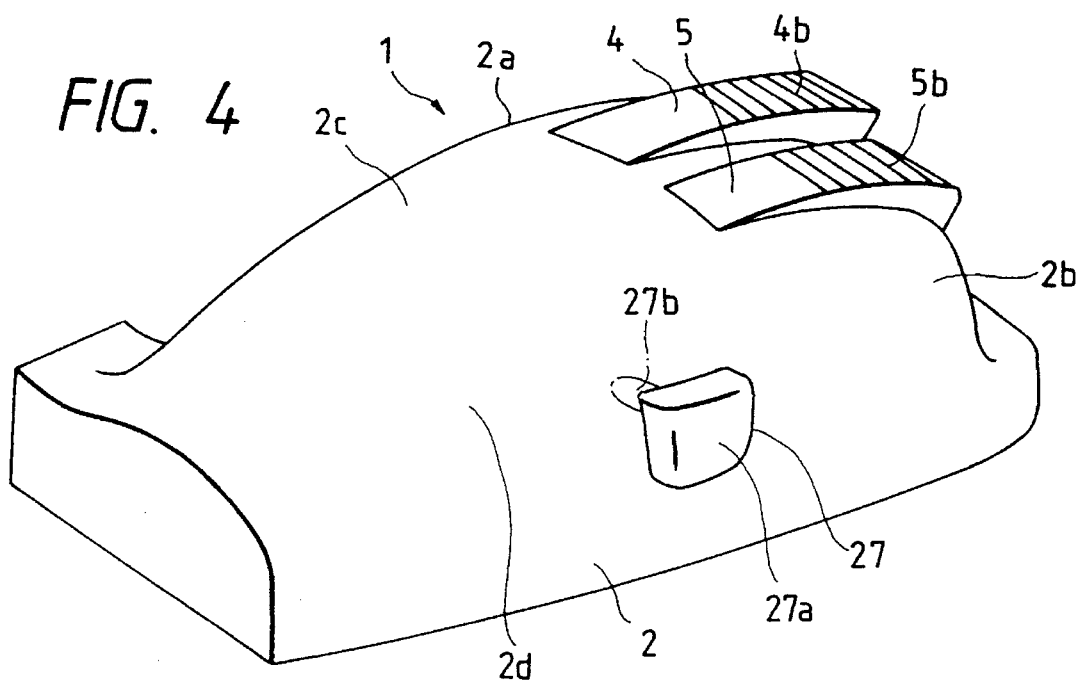
FIG. 4 is a perspective view illustrative of another embodiment of the present invention.

FIG. 1 is a perspective view illustrative of the outer appearance of a switching device for opening and closing vehicle windows according to one embodiment of the present invention. FIG. 2 is a sectional view along A—A line of FIG. 1. FIG. 3 is a perspective view illustrative of the switching device shown in FIG. 1 built into a door panel of a vehicle. FIG. 4 is a perspective view illustrative of another embodiment of the present invention.

Referring to FIGS. 1 and 2, a switching device 1 has a case 2. Switching operation members 4 and 5 (a first operation member group 6) are disposed in parallel and are arranged in the forward portion (indicated by the arrow A in FIG. 1) of the case 2. The switching operation members 4 and 5 are also pivotally mounted on the case 2 via support portions 4a and 5a, respectively. A second switching operation member 7 is attached in the rearward portion of the case 2 via a support portion 7a. Mounted on a printed board 11 within the case 2 are seesaw switches 8 and 9 driven by the switching operation members 4 and 5 respectively, and an automatic reset switch 10 driven by the second switching operation member 7.

The case 2 has a shaped portion 2a which is generally sized and formed in a shape which can be easily covered by the palm of the operator's hand. More specifically, a front portion 2b is curved to have a comparatively small curvature; a central portion 2c has a relatively flattened curve; and a rear portion 2d is curved to be somewhat tilted from the central portion 2c. The width of the hill-shaped portion 2a is best sized to be covered by the palm of the operator's hand, but it is possible to use more than the above size.

The switching operation members 4 and 5 are placed in such a way that operation portions 4b and 5b are exposed on the surface of the case 2 from the central portion 2c to the front portion 2b and also project forward from the front portion 2b. Further, as with piano-type keys, the switching operation members 4 and 5 are pivotally attached by the support portions 4a and 5a located to other than when the switching operation is performed. Accordingly, the driving sections 4c and 5c are also adapted to be automatically returned to the neutral position. The invention may be modified such that urging members may be arranged specially for the purpose of automatically returning the driving sections 4c and 5c to the neutral positions.

Each of the seesaw switches 8 and 9 is constructed of two circuits which are switched in two stages. It is thus possible to perform the switching operation in two stages depending on the amount in which the driven sections are pushed, that is, depending on the degree to which the pressing or lifting operation is performed on the operation portions 4b and 5b. The operation in a first stage is performed to allow the switches to be manually actuated, while the operation in a second stage is performed to allow the switches to be automatically actuated. More specifically, in the first stage, an actuation mechanism, that is, a window opening and closing mechanism, is actuated only when the operation member continues to be engaged by the operator, while in the second stage, the window is completely opened or closed even if the operator ceases to engage the operation member half way through the closing operation.

The second switching operation member 7 is disposed in such a way that a operation portion 7b is pivotally attached to the rear portion 2d of the case 2 via the support portion 7a. The second switching operation member 7 is formed wider than and opposedly face operation portions 4b and 5b so that the operation portions 4b and 5b can be pressed and that the forward ends thereof can be pulled upward with the operator's fingers laid thereon. This ease of operation is achieved due to a synergistic effect of the configurations of the hill-shaped portion 2a and the switching operation members 4 and 5. The switching operation member 4 projects from the forward end of the hill-shaped portion 2a for a distance different from that of the other member 5. The determination of which member projects for a greater distance is made in relation to the finger used. In general, the switching operation members 4 and 5 are operated with the forefinger and the middle finger, and the member operated with the middle finger accordingly projects a greater distance than the other member operated with the forefinger. When the hill-shaped portion 2a is held by the palm, the fingertips are naturally placed on the corresponding switching operation members 4 and 5. Thus, the switching operation member 4 and 5 can be differentiated even when groped for without being observed.

A pair of driving sections 4c, 4c and 5c, 5c are arranged to face each other with respect to the support portions 4a and 5a, respectively, so as to project downward from the bottom surface of the operation members 4 and 5 and to abut against driven sections 8a, 8b, 9a and 9b of the respective seesaw switches 8 and 9. The seesaw switches 8 and 9 are adapted to be automatically returned to the neutral positions by built-in urging members at all times than the first operation member group 6 (the switching operation members 4 and 5). This is because the second switching operation member 7 is operated with a part of the palm adjacent to the wrist, and thus, greater dimensions ensure the reliable manipulation of the second switching operation member 7. A driving section 7c for driving the automatic reset switch 10 is formed at a bottom surface of the second switching operation member 7 and abuts against a driven section 10a of the reset switch 10. The reset switch 10 has a built-in urging member for allowing the driven section 10a to be reset to the OFF position at all times other than when the switching operation is performed. Accordingly, the second switching operation member 7 having the driving section 7c abut against the driven section 10a is constructed to be automatically reset to the OFF position. An urging member specially used for the purpose of automatically resetting the second switching operation member 7 may be arranged.

FIG. 3 is a perspective view of the switching device 1 constructed as described above attached to a door panel of a vehicle. An arm rest 13 is attached to a door panel 12, and the switching device 1 is attached to the forward portion of the arm rest 13. FIG. 3 shows the switching device 1 attached to a door panel 12 next to a front left seat of a left-hand drive vehicle. The switching device 1 is positioned in place so that a space 14 can be formed between the hill-shaped portion 2a of the device 1 and an internal surface of the door panel 12. Hence, when the hill-shaped portion 2a is covered by the operator's palm, the little finger is comfortably fit into the space 14, thereby enhancing easy switching operation. Moreover, mounted on the arm rest 13 is a type of switch group other than the switching device 1, for example, a group of mirror control switches 15. The present invention may be applied to a modification such that a case for integrally accommodating the switching device 1 and the mirror control switch group 15 therein is attached to the arm rest 13.

With the switching device 1 constructed as described above according to the present invention, when the palm is laid on the hill-shaped portion 2a of the case 2, the middle finger and the forefinger are naturally placed on the operation portions 4b and 5b of the first switching operation members 4 and 5, respectively, while a part of the palm adjacent to the wrist is placed on the operation portion 7b of the second switching operation member 7. Consequently, the members can be naturally operated while being covered by the palm.

The actual switching operation is performed as follows. The first operation member group 6 (the switching operation members 4 and 5) only is manipulated to actuate the respective left and right windows located adjacent to the front seat. During this actuation, the first operation member group 6 is pressed to open the windows, while it is lifted to close the windows. Further, either of the manual and automatic operations can be performed depending on the degree to which the first group is pressed or lifted.

FIG. 4 is a perspective view illustrative of another embodiment of the present invention. The same components as those shown in FIGS. 1–3 are designated by like reference numerals, and an explanation thereof will thus be omitted. This embodiment shown in FIG. 4 is characterized in that a operation portion 27a of a second switching operation member 27 is disposed on the lateral surface of the hill-shaped portion 2a of the case 2 so that it can be operated by the operator's thumb. The operation portion 27a is attached to the lateral surface of the hill-shaped portion 2a of the case 2, as described above, so as to be freely pulled and pushed, and a driving section 27b is formed on the internal surface of the member 27 so as to drive an automatic reset switch disposed within the case 2. The operation portion 27a is automatically reset in a manner similar to the counterpart of the first embodiment.

In the foregoing embodiment the first operation member group 6 is operated similarly in that only one end of each piano-type key is depressed. However, it may be constructed in a manner similar to an operation portion of a seesaw switch, that is, one end thereof is pressed to open the window, while the other end is pressed to close the window. In such a case, a driven section of the seesaw switch may be directly used as a switching operation member. This modification disadvantageously lowers the degree of the effect obtained by the configuration of the front portion of the case, but may be tolerable depending on the condition of use.

The second operation member of the first embodiment of a type which is operated by means of pivoting, while that of the second embodiment is of a type which is operated by means of linearly pushing. These members may be exchanged without an impairment of the purpose of the present invention.

Although in the foregoing embodiments the switching device is applied to a left-hand drive vehicle, it may be applicable to a right-hand drive vehicle as well, in which case, the right and left sides of the case are simply symmetrically reversed.

As will be clearly understood from the foregoing description, the present invention offers the following advantages.

There can be a decrease in the number of switching operation members, which can thus be easily operated even groped for without being observed. Also, since the operation members are placed as described above, the first members or the first member group and the second member can be simultaneously operated. Further, a switch driven by the second operation member is adapted to be automatically reset so that actuation mechanisms, for example, window opening and closing mechanisms, can be switched only when the second member is operated. Hence, it is possible to operate an actuation mechanism which is normally actuated at comparatively high frequencies without paying attention to whether such a mechanism is ready to be actuated which otherwise would involve another switching operation.

What is claimed is:

1. A switching device for selectively controlling one of a first mechanism and a second mechanism, the switching device comprising:
   a first switch assembly including a first operation member and a first switch, the first switch generating control signals in response to manipulation of the first operation member; and
   a second switch assembly including a second operation member and a second switch, the second switch being actuated by the second operation member to enter a first state when the second operation member is pressed, the second switch being biased into a second state when the second operation member is released;
   wherein the control signals generated by the first switch assembly control the first mechanism when the second switch is in the first state, and the control signals generated by the first switch assembly control the second mechanism when the second switch is in the second state.

2. The switching device according to claim 1, further comprising a case, wherein the second operation member is mounted on a rear portion of the case such that the second operation member is manipulated by a palm of an operator's hand, and wherein the first operation member is mounted on a front portion of the case such that the first operation member is manipulated by a finger of the operator's hand.

3. The switching device according to claim 1, further comprising a case, wherein the second operation member is mounted on a side portion of the case such that the second operation member is manipulated by a thumb of an operator's hand, and wherein the first operation member is mounted on a front portion of the case such that the first operation member is manipulated by a finger of the operator's hand.

4. A switching device for selectively controlling front and rear vehicle windows, the switching device comprising:
   a case having a rear portion, a side portion and a front portion;
   a first switch assembly including first and second operation members pivotally mounted on the front portion of the case, and first and second switches disposed in the case such that manual pivoting of the first operation member actuates the first switch, and manual pivoting of the second operation member actuates the second switch; and
   a second switch assembly mounted on the case including a third operation member and a third switch disposed in the case such that manual depression of the third operation member causes the third switch to enter a first switched state, the third switch being biased into a second switched state when the third operation member is released;
   wherein right and left front vehicle windows are respectively controlled by actuation of the first and second switches when the third switch is in the second switched state, and right and left rear windows are respectively controlled by the first and second switches when the third switch is in the first switched state.

5. The switching device according to claim 4, wherein the third operation member is mounted on the rear portion of the case such that the third operation member is manipulated by a palm of an operator's hand while the first and second operation members are manipulated by fingers of the operator's hand.

6. The switching device according to claim 4, wherein the third operation member is mounted on the side portion of the case such that the third operation member is manipulated by a thumb of an operator's hand while the first and second operation members are manipulated by fingers of the operator's hand.

7. A switching device mounted on a vehicle door for allowing a vehicle operator to open or close a selected one of a plurality of vehicle windows, the switching device comprising:

a case having a rear portion shaped to receive a palm of the operator's hand, the case also having a front portion;

a first switch assembly including:
first and second operation members extending from the front portion of the case and pivotally mounted on the case such that the first and second operation members are pivotable in first and second directions by finger tips of the operator's hand when the palm of the operator's hand is resting on the rear portion, and first and second switches mounted in the case such that manipulation of the first and second operation members actuates the first and second switches, respectively; and a second switch assembly including:
a third operation member pivotally mounted on the case, and
a third switch mounted in the case, the third switch being actuated into a first state when the third operation member is depressed by the operator's hand, the third switch being biased into a second state when the third operation member is released;

wherein right and left rear vehicle windows are controlled by the first switch assembly when the third switch is in the first state, and right and left front vehicle windows are controlled by the first switch assembly when the third switch is in the second state.

8. The switching device according to claim 7, wherein the third operation member is mounted on the rear portion of the case such that the third operation member is manipulated by the palm of the operator's hand.

9. The switching device according to claim 7, wherein the third operation member is mounted on the side portion of the case such that the third operation member is manipulated by a thumb of the operator's hand.

* * * * *